US008479860B1

(12) United States Patent
Jorgenson (10) Patent No.: US 8,479,860 B1
(45) Date of Patent: Jul. 9, 2013

(54) ALL TERRAIN ENDLESS TRACK VEHICLE

(75) Inventor: Kristopher J. Jorgenson, Red Lake Falls, MN (US)

(73) Assignee: LRET, Inc., Minnetonka, MN (US)

( * ) Notice: Subject to any disclaimer, the term of this patent is extended or adjusted under 35 U.S.C. 154(b) by 4 days.

(21) Appl. No.: 13/194,977

(22) Filed: Jul. 31, 2011

Related U.S. Application Data (60) Provisional application No. 61/469,454, filed on Mar. 30, 2011.

(51) Int. Cl.
*B62M 27/02* (2006.01)

(52) U.S. Cl.
CPC .................................... *B62M 27/02* (2013.01)
USPC ............................. 180/193; 180/184; 180/190

(58) Field of Classification Search
USPC .......................................... 180/184, 190, 193
See application file for complete search history.

(56) References Cited

U.S. PATENT DOCUMENTS

| 1,454,105 | A | * | 5/1923 | Coffey et al. | 180/192 |
|---|---|---|---|---|---|
| 2,289,768 | A | | 7/1942 | Fehrenbaeher | |
| 2,702,088 | A | | 2/1955 | Klimek, Jr. | 180/190 |
| 2,855,059 | A | * | 10/1958 | Sutherland | 180/9.62 |
| 3,221,830 | A | | 12/1965 | Walsh | 180/180 |
| 3,509,955 | A | * | 5/1970 | Lichfield | 180/190 |
| 3,590,523 | A | | 7/1971 | Riesgraf | 446/433 |
| 3,703,936 | A | * | 11/1972 | Padwick et al. | 180/193 |
| 3,720,277 | A | | 3/1973 | Masaoka | |
| 3,734,221 | A | | 5/1973 | Labelle | |
| 4,036,320 | A | | 7/1977 | Rabehl | 180/9.1 |
| 4,146,101 | A | | 3/1979 | Plourde | 180/190 |
| 4,848,503 | A | | 7/1989 | Yasui et al. | |
| 4,987,965 | A | * | 1/1991 | Bourret | 180/193 |
| 5,332,058 | A | | 7/1994 | Bianco | 180/180 |
| 5,474,146 | A | | 12/1995 | Yoshioka et al. | |
| 5,944,134 | A | | 8/1999 | Peppel et al. | |
| 6,193,003 | B1 | | 2/2001 | Dempster | 180/180 |
| 7,040,438 | B2 | * | 5/2006 | Yoshihara | 180/193 |
| 7,854,285 | B1 | | 12/2010 | Giese | |
| 7,891,454 | B2 | | 2/2011 | Giese et al. | |
| 2004/0195024 | A1 | | 10/2004 | Takahiko et al. | 180/193 |
| 2007/0221424 | A1 | | 9/2007 | Giese | |
| 2010/0071982 | A1 | | 3/2010 | Giese | |

* cited by examiner

*Primary Examiner* — Joseph Rocca
*Assistant Examiner* — Maurice Williams
(74) *Attorney, Agent, or Firm* — DeFault Law Firm, P.C.; Dustin R. DeuFault (57) ABSTRACT

An all terrain endless track vehicle of the present invention comprises a front suspension assembly and a rear endless track assembly supported by a chassis. The front suspension assembly is engageable with the ground by a steerable set of skis or wheels. The endless track assembly supports an engine, transmission and first and second shock absorbers. The first shock absorber connects to the endless track assembly forward of the engine, while the second shock absorber connects to the endless track assembly rearward of the engine. A rear swing arm supports a rearwardly positioned main driver mechanically linked to the transmission by way of a chain or belt. A plurality of idler wheels disposed on the endless track assembly, along with the main driver, define an endless track contour. An endless track or belt disposes on the plurality of idler wheels and the main driver. The engine, transmission, and shock absorbers are each contained within the contour of the endless track.

14 Claims, 8 Drawing Sheets

ALL TERRAIN ENDLESS TRACK VEHICLE

CROSS-REFERENCE TO RELATED APPLICATION(S)

The present application claims a benefit of U.S. Provisional Application No. 61/469,454 filed on Mar. 30, 2011, which is hereby incorporated herein in its entirety by reference.

BACKGROUND OF THE INVENTION

The present invention relates to all terrain vehicles. More particularly, the present invention relates to an all terrain vehicle employing an endless track, such as for example a snowmobile, in which an engine is positioned within the endless track.

For more than the past fifty years, snowmobiling has been an ever increasing way of pleasure travel in winter time climates, especially in snow covered regions of the world. Examples of early snowmobiles include U.S. Pat. No. 2,289,768, which was a motorized snow sled wherein the driver rode a sled on the ground while being pulled by a tracked locomotive.

Several advancements in the art have occurred since then, however the drive system components in the past 45 years are still the same style of components and are still in generally the same locations. Modern day snowmobiles generally include a forward positioned engine on skis powering a belt driven continuous variable transmission ("CVT"), which in turn powers a jackshaft which drives a chain to the drive roller axle which propels the endless track via engagement lugs on the endless track. Generally the CVT is on one side of the endless track and the chain is on the opposite side of the track and both components add width beyond that of the endless track width. The overall system efficiency of the industry accepted drive system has resulted in the need for high horsepower engines in order to achieve a high performance snowmobile. Therefore the primary engine of choice is a liquid cooled engine to achieve the highest possible power-to-weight ratio. Positioning the engine as low as possible forward of the endless track has become the normal location. Associated complementary drive components are generally located between the engine and front drive roller.

Endless tracks of the prior art are generally supported by five components which create the geometry of the pathway in which the endless track profile is defined by. Generally the shape of the profile is a parallelogram having a front driver roller of between and 7 to 9 inches and several idler rollers having diameters between 6 to 8 inches. When the suspension of the skid frame is compressed the track profile becomes more of an oval shape. The industry standard location of the drive roller is at the front of the endless track which is an inefficient location for propelling the snowmobile forward as approximately 85-90% of the endless track is under load. Another component of the endless track is tensile cords that are molded within the rubber to help prevent the track from stretching under load. While these cords help to minimize the stored energy of the rubber under load, they add to the energy needed to bend the endless track around the drive roller and corresponding idler rollers traveling around its defined pathway. The bend angles based on the pitch length of the endless track on typical snowmobiles can vary between 17-22° with corresponding 9 or 7 inch drive wheel and 8 or 6 inch rear idler rollers on the skid rail. Therefore the more length the endless track is under load and the greater the bend angle the more energy losses there are to propel the endless track. These are two large factors that influence the overall vehicle efficiency. Further, the preset endless track tightness of current snowmobiles must be properly maintained by the user because if the endless track becomes too loose the drive roller engagement of the endless track lugs can skip under load resulting in loss of acceleration. This preset endless track tightness also lends itself to more energy being put into the endless track to travel along its defined pathway. With the aforementioned considerations in mind, overall system efficiency of modern snowmobiles is approximately 50-55%, which has become generally accepted. To compensate for these efficiency losses, the industry generally makes high horsepower engines to produce a popular vehicle to ride.

In recent years, snowmobile manufacturers have been attempting designs which make the snowmobile more nimble and agile. Such designs include attempting to bring the riding position of the rider forward towards the skis. However, the current engine and corresponding drive components locations in snowmobiles of the prior art has limited how far forward the rider can sit. The placement of the engine relative to the endless track has also controlled the location of the gas tank, as it is typically located directly above the endless track relative to the ground. Further, as all snowmobiles with a belt drive CVT, jackshaft, and chain to the drive roller axle, these components are positioned on the outside of the track width, thereby inhibiting the streamlining of the snowmobile.

Another fixed condition of current snowmobile designs includes the positioning of the rider's feet. As snowmobiles tend to place the rider directly above the endless track, the legs and feet of the rider must be spaced apart at least as wide as the width of the track.

Another concern inherent with current endless track designs of liquid cooled snowmobiles is that they do not offer any possibility for driving in non-snow terrains for long durations. Because of the power losses associated in their inefficient drive system design, the necessary heat rejection of the engine is typically dependant on snow as a cooling agent to keep engines at their regular operating temperatures.

Finally, an overriding concern for all snowmobile manufacturers and riders is the smoothness and comfort of the ride. While there have been advances in suspension systems, especially over the last 25 years, none have been able to adequately provide a progressively linked rear suspension system for both the rear and front portions of the skid frame.

There therefore exists a need in the art to overcome these shortcomings. It is therefore an object of the present invention to provide an all terrain endless track vehicle with improved overall system efficiency in order to use an engine with less horsepower. It is also an object of the present invention to provide an endless track vehicle having more options for both the front and rear portions of the skid frame suspension. It is also an object of the present invention to provide an endless track vehicle having more options for the rider position. It is also an object of the present invention to provide an endless track vehicle having a more centralized center of mass as well as a lower center of mass for the overall vehicle. It is a further object of the present invention to provide an all terrain endless track vehicle having an engine positioned within an endless track. It is a further object of the present invention to provide an all terrain endless track vehicle operable in a variety of terrains, including non-snow terrains. It is an even further object of the present invention to provide an all terrain endless track vehicle operable in a wide range of temperature conditions, including temperate climates.

BRIEF SUMMARY OF INVENTION

An all terrain endless track vehicle of the present invention includes a chassis containing a forward suspension assembly and a rear suspension assembly. The forward suspension assembly includes first and second spaced-apart A-arm members supporting spindles on each end. Connected to each spindle is a ski for contacting the ground and controlling direction of the vehicle through a steering mechanism. Shock absorbers independently connect to each ski.

The rear suspension assembly includes a progressively linked suspension, engine, transmission, final drive, and drive roller axle all contained within an endless track. The endless track rides on a system of idler wheels and a rearwardly positioned main driver mechanically linked to the transmission and engine. The contour of the endless track defined by the system of idler wheels and the main driver does not exceed a bend angle of 10°. The progressively linked suspension includes forward and rearward shock absorbers uncoupled to one another. The forward shock absorber couples to a forward swing arm pivotally connected to the chassis and the skid frame. The rearward shock absorber couples to a rear swing arm pivotally connected to the chassis and the drive roller.

The vehicle further includes a seating area for supporting a rider positioned on the chassis between the forward and rearward suspension assemblies. The seating area allows the legs and feet of the rider to be positioned forward of the endless track and/or on the outside of the width of the endless track. From the seating area, the rider is permitted control of the direction of the vehicle through the steering mechanism and by means of a throttle, clutch and shifting levers which may be operated by either hand or foot to control the speed of the vehicle.

BRIEF DESCRIPTION OF THE DRAWINGS

The following figures are used herein in conjunction with the specification to assist in understanding the invention. The Figures are as follows.

DESCRIPTION OF THE INVENTION

An all terrain endless track vehicle in accordance with the present invention is generally indicated at 20 in FIGS. 1 through 12. The endless track vehicle 20 generally includes a front suspension assembly 22 and a rear suspension assembly 24 connected to a chassis 26. The front suspension assembly 22 includes an upper A-arm 28 and a lower A-arm 30 attached to the chassis 26. Positioned on opposing ends of each A-arm 28, 30 is a spindle 32 on which are mounted skis 34 and corresponding spring shock absorbers 36. The spindle 32 permits the positioning of the skis 34 to be adjusted by means of a steering mechanism, which includes a steering post 38, handle bars 40 and steering rod 42. A bumper 44 may also be included to protect the forward parts of the machine 20.

Figure 1:
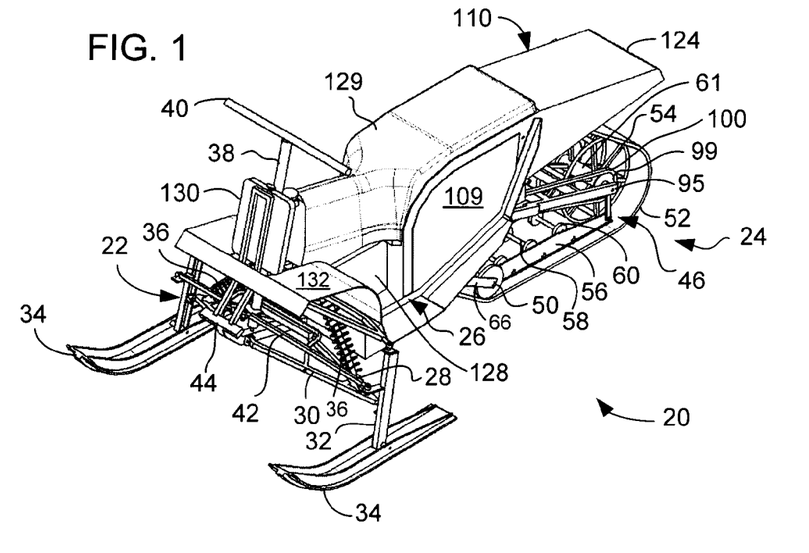
FIG. 1 is front-left perspective view of an all terrain endless track vehicle of the present invention.
Figure 2:
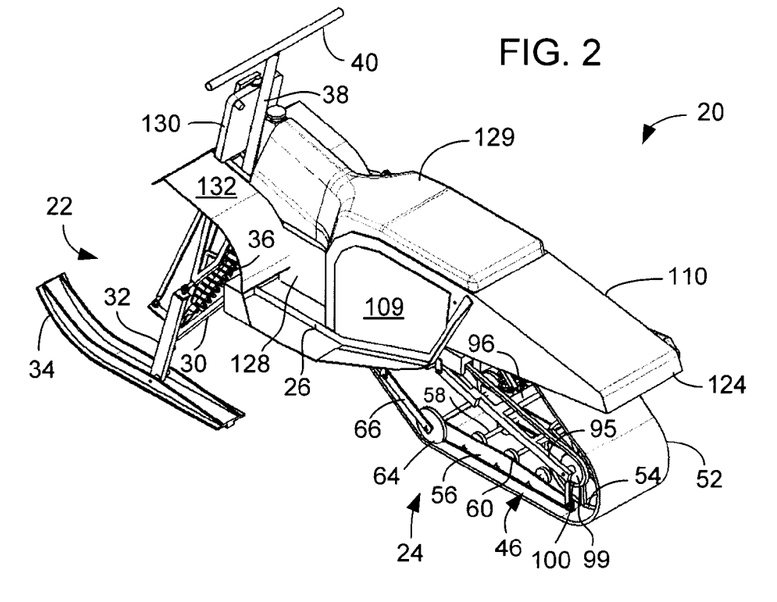
FIG. 2 is a back-left perspective view of the all terrain endless track vehicle of the present invention.
Figure 3:
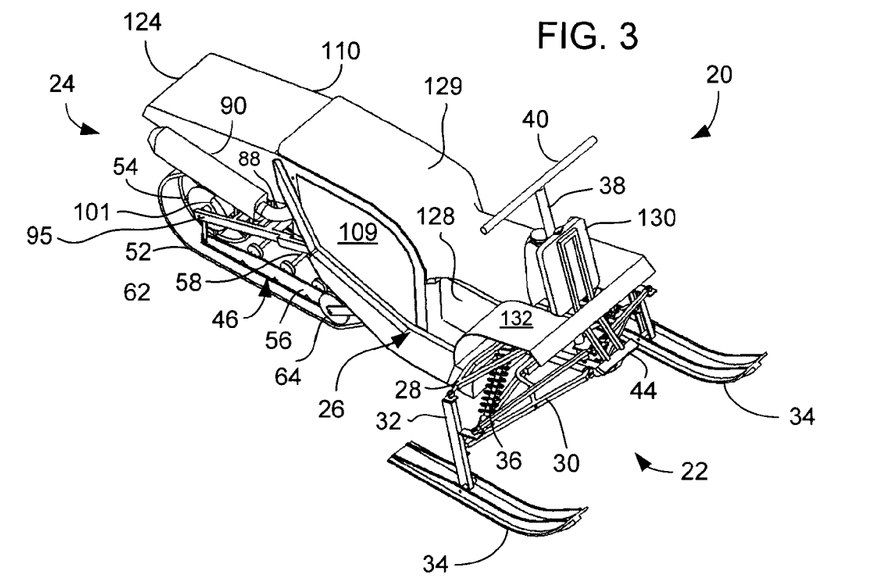
FIG. 3 is front-right perspective view of the all terrain endless track vehicle of the present invention.
Figure 4:
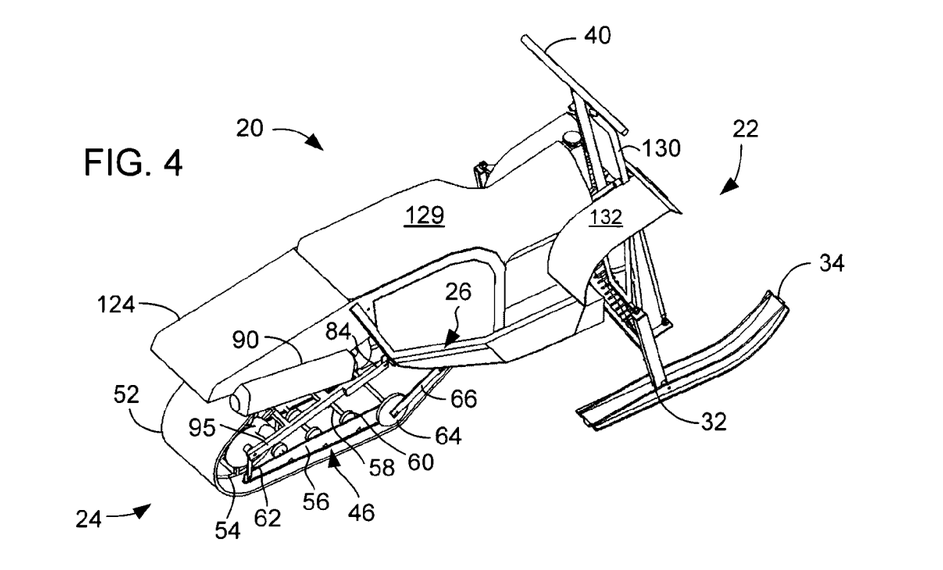
FIG. 4 is back-right perspective view of the all terrain endless track vehicle of the present invention.
Figure 5:
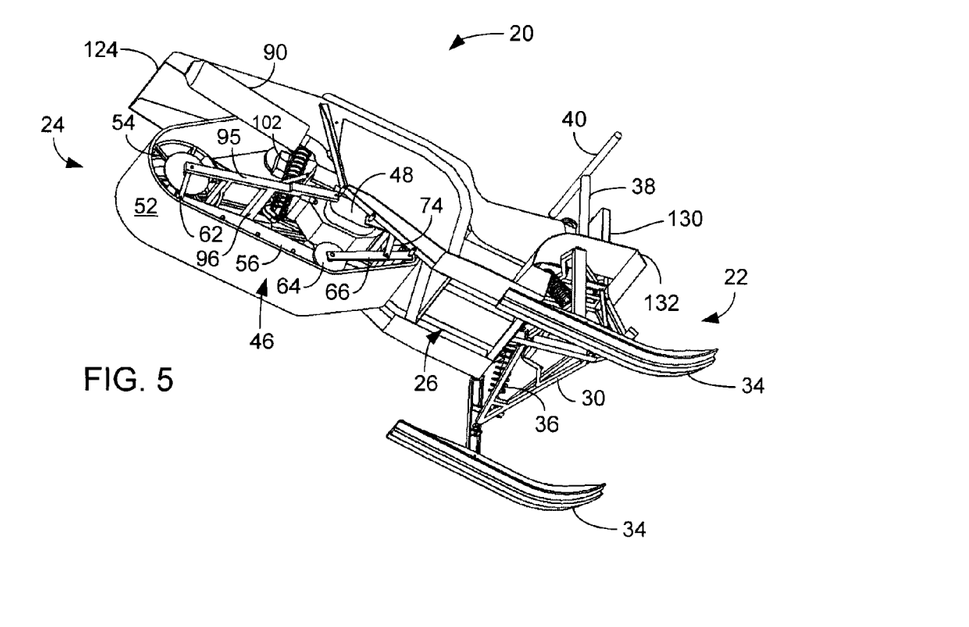
FIG. 5 is right-underside perspective view of the all terrain endless track vehicle of the present invention.
Figure 6:
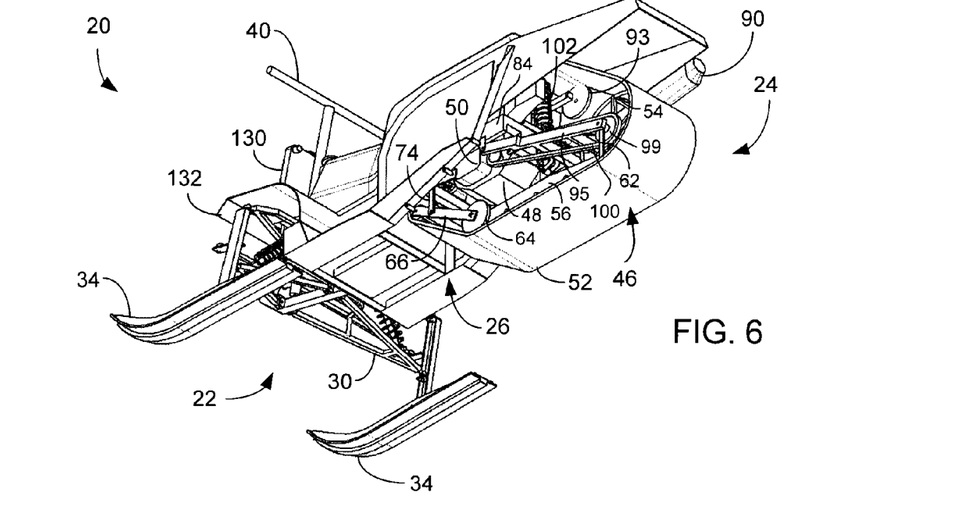
FIG. 6 is left-underside perspective view of the all terrain endless track vehicle of the present invention.
Figure 7:
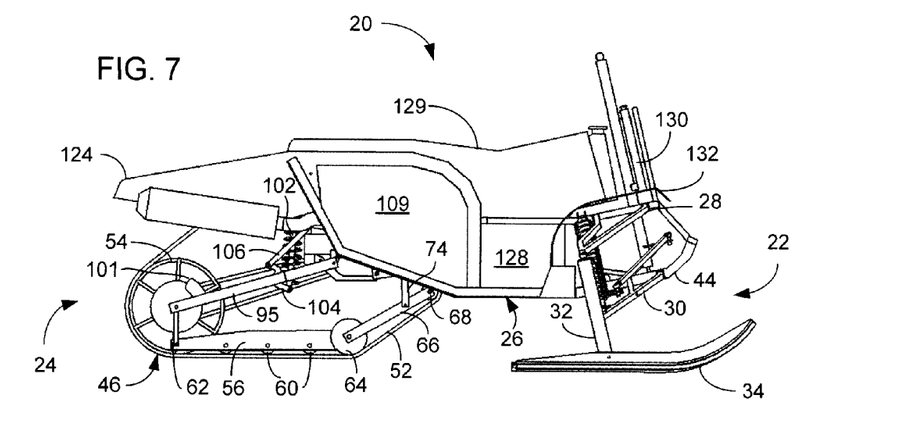
FIG. 7 is a right-side view of the all terrain endless track vehicle of the present invention.
Figure 8:
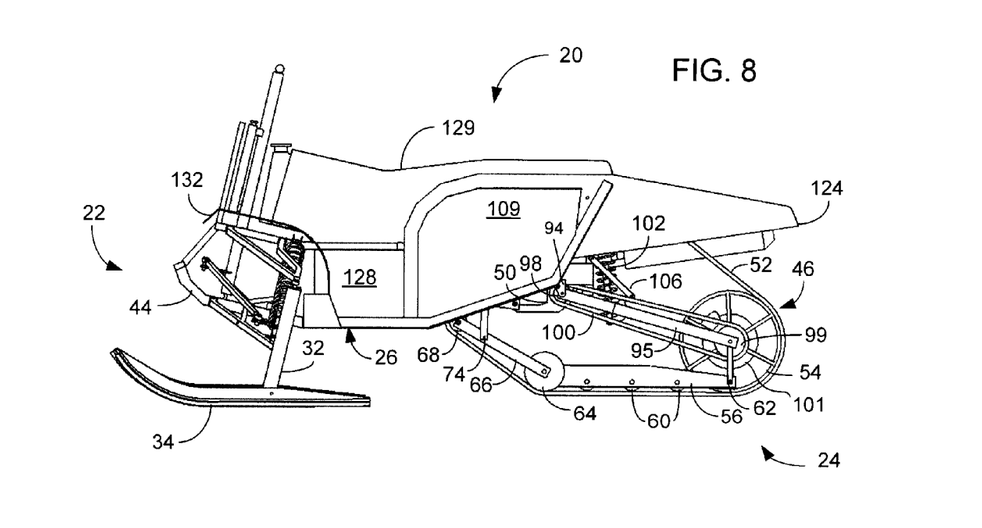
FIG. 8 is a left-side view of the all terrain endless track vehicle of the present invention.
Figure 9:
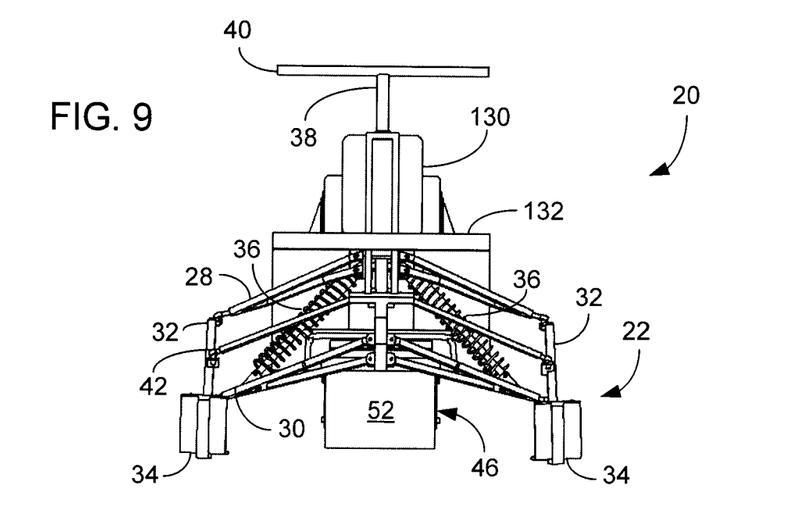
FIG. 9 is a front view of the all terrain endless track vehicle of the present invention.
Figure 10:
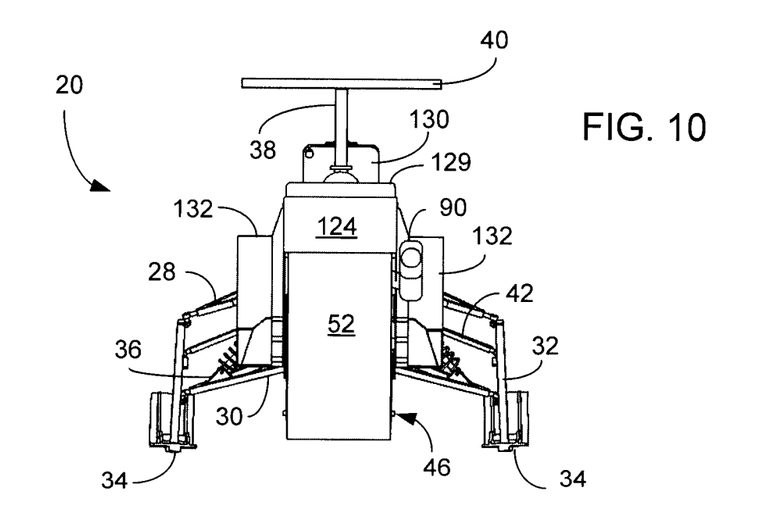
FIG. 10 is a back view of the all terrain endless track vehicle of the present invention.
Figure 11:
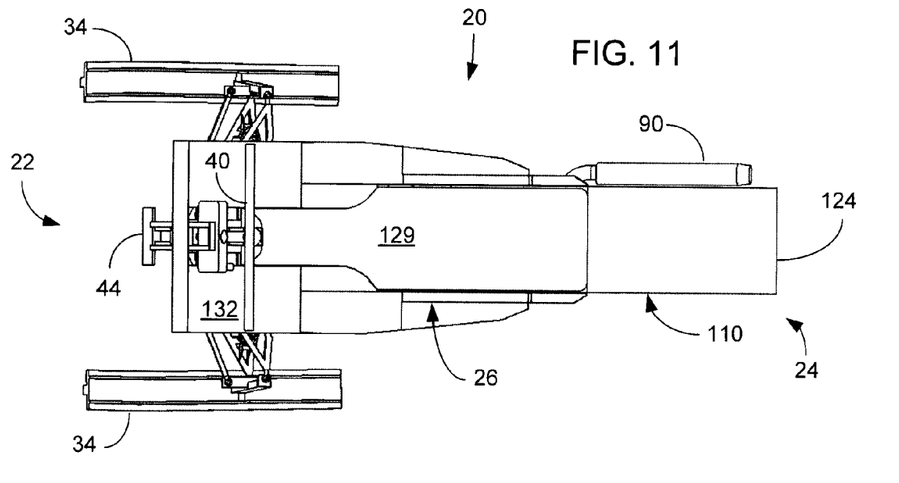
FIG. 11 is a top view of the all terrain endless track vehicle of the present invention.
Figure 12:
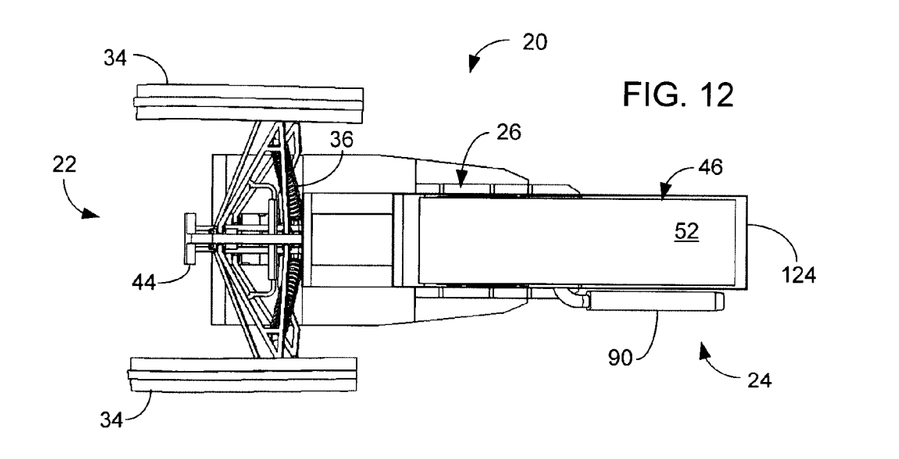
FIG. 12 is a bottom view of the all terrain endless track vehicle of the present invention.
Figure 13:
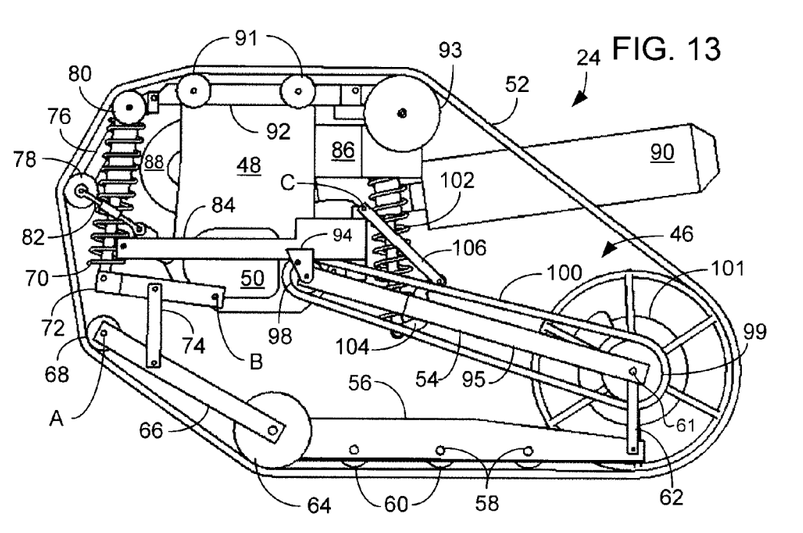
FIG. 13 is a left-side view of an endless track assembly of the present invention.
Figure 14:
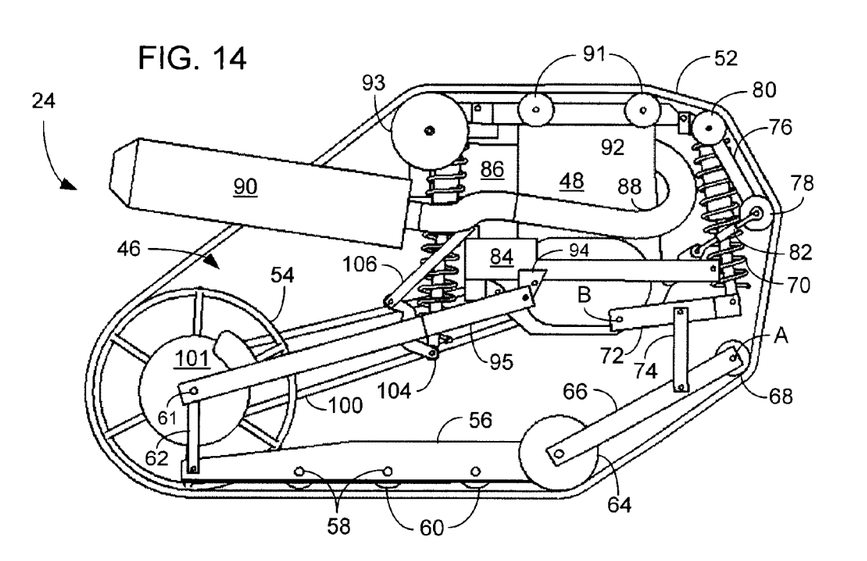
FIG. 14 is a right-side view of an endless track assembly of the present invention.

The rear suspension assembly 24 includes an endless track sub-frame assembly 46 attached to the chassis 26 in which are disposed an engine 48 and a transmission 50. Referring to FIGS. 13 and 14, the endless track sub-frame 46 includes an endless track 52 extending around a rearwardly positioned drive roller 54 and a system of large and small idler rollers defining the endless track pathway. Drive roller 54 preferably includes a diameter of between 14 and 20 inches, and more preferably about 14.5 inches. Driver roller 54, having the necessary engagement lugs (not shown) as is known in the art, is powered by the engine 48 and transmission 50 to drive the endless track 52 and propel the vehicle 20. The drive roller 54 is located at the rear of the sub-frame assembly 46. The sub-frame assembly 46 also includes opposing skid rails 56 with a plurality of cross shafts 58 disposed therebetween. Each cross shaft 58 contains idler rollers 60, preferably having diameters of between 2 to 3 inches, rotatably attached thereto for urging the endless track 52 into contact with the ground. A distal end of each skid rail 56 connects to the drive roller axle 61 via a connecting link 62. Each connecting link 62 is pivotally attached at each end. An opposing end of each skid rail 56 includes a rotatably attached idler roller 64, preferably having a diameter of approximately 6 inches, for contacting the endless track 52. The opposing end of each skid rail 56 further includes a pivotally attached forward swing arm 66 having rotatably attached idler rollers 68, preferably having diameters of between 2 to 3 inches, at an opposing end thereof for contacting the endless track 52. Swing arm 66 pivotally attaches to the chassis 26 at point A.

The forward swing arms 66, whose opposing ends pivotally attach to the chassis 26, work in conjunction with a front shock absorber 70 to ensure ground contact of the endless track 52 at the forward portion of the rear suspension assembly 24 with varying ground conditions. Each forward swing arm 66 is held in position by a pivotal front shock arm 72 connected to the shock absorber 70. Respective front linkages 74 link each front swing arm 66 with front shock arm 72. Each front shock arm 72 pivotally attaches to the shock absorber 70 at a proximal end thereof, while an opposing distal end pivotally attaches to the top frame 92 at point B. This combination permits the skid rails 56 and front swing arm 72 to work in conjunction with one another against the force provided by the front shock absorber 70 to permit travel of the idler roller 64 ensuring ground engagement during travel of the vehicle 20. The front shock absorber 70, front shock arm 72 and front linkages 74 permit the front swing arm 66 to travel in an arc based on the pivot at the chassis 26 until the shock absorber 70 is fully compressed. Also, because of the linkage system the rate of travel on the shock absorber 70 increases, or exhibits a rising rate of dampening, as it is being compressed, the shock absorber is a progressive style of suspension. It should be noted, though, that it is well within the scope of the present invention to provide different linkages at different pivotally connections to still achieve a progressive style suspension.

To provide variable preset tightness of the endless track 52, adjustable arms 76 are provided extending downwardly proximate the front shock 70. First and second sets of idler rollers, 78 and 80 respectively, preferably having diameters of between 2 to 3 inches, rotatably attach to opposing ends of each adjustable arm 76 to contact the endless track 52. Each arm 76 is adjustable by respective turnbuckles 82 attached to the respective arm 76 and a lower frame 84. By increasing or decreasing the length of each turnbuckle 82, the adjustable arms 76 are positionable to provide for more of less tightness on the endless track 52 through the engagement of the idler rollers 78.

The lower frame 84 connects to the chassis 26 and supports the engine 48, transmission 49, and exhaust pipe 88. A top frame 92 also connects to the chassis 26 and further supports the engine 48 and intake airbox 86. The top frame 92 also supports rotatably attached idlers 91, which have a preferable diameter of between 2 to 3 inches, and idler 93, preferably having a diameter of about 6 inches, each of which prevent the endless track 52 from contacting the engine. Brackets 94 attached to the lower frame 84 permit pivotal attachment of rear swing arms 95, which extend to the drive roller 54. Disposed between each rear swing arm 95 are cross members 96 for providing support and rigidity. A sprocket 98 mechanically links to a sprocket 99 at drive roller 54 by means of a chain or belt 100. It should be noted, though, that it is well within the scope of the present invention to provide a shaft drive, instead of a belt or chain, as is known in the art. A disk brake 101 also attaches to drive roller 54, which can be controlled by the driver to slow or stop the vehicle 20.

To provide shock absorption on the rear portion of the sub-frame assembly 46, a rear shock absorber 102 is provided. An upper end of the rear shock absorber 102 pivotally connects to the top frame 92 while a lower end pivotally attaches to a rear shock arm 104 pivotally connected to a forward cross member 96 of the rear swing arms 95. A set of rear link arms 106 connects to the rear shock arm 104 and the bottom frame 84. Rear link arm 106 pivotally attaches to the chassis cross arm 126 at point C. The rear shock absorber 102, rear shock arm 104 and rear link arms 106 allow the rear swing arm 95 to travel in an arc based on the pivot at the bottom frame 84 until the shock absorber 102 is fully compressed. Also, because of the linkage system the rate of travel on the shock absorber 102 increases as it is being compressed and thus is a progressive style of suspension. It should be noted, though, that it is well within the scope of the present invention to provide different linkages at different pivotally connections to still achieve a progressive style suspension. As motion of the front shock absorber 70 and the rear shock absorber 102 are independent from one another, the rear suspension assembly is uncoupled. An uncoupled suspension functions independently front-to-rear and rear-to-front. A deflection of the front portion of the suspension causes little to no deflection of the rear portion and vice versa.

Each of the engine 48, transmission 50, main driver 54, skids 56, cross shaft 58, idler wheels 660, 64, 68, 78, 80, 91, 93, main axle 61, forward swing arm 64, front shock 70, front shock arm 72, front linkage 74, adjustable arms 76, turnbuckles 82, lower frame 84, top frame 92, rear shock 102, rear shock arm 104 and rear linkage 106 are contained within the width and contour of the endless track 52. The contour of the endless track defined by the system of idler wheels and the main driver does not exceed a bend angle of 10°.

Figure 15:
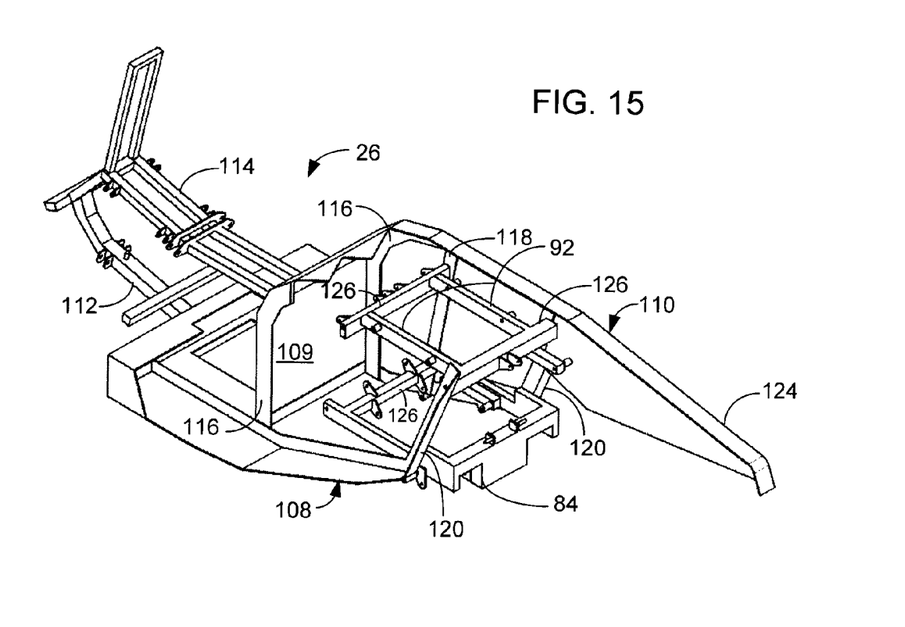
FIG. 15 is a back-left perspective view of the chassis in accordance the present invention with portions of the shielding and tail section removed.
Figure 16:
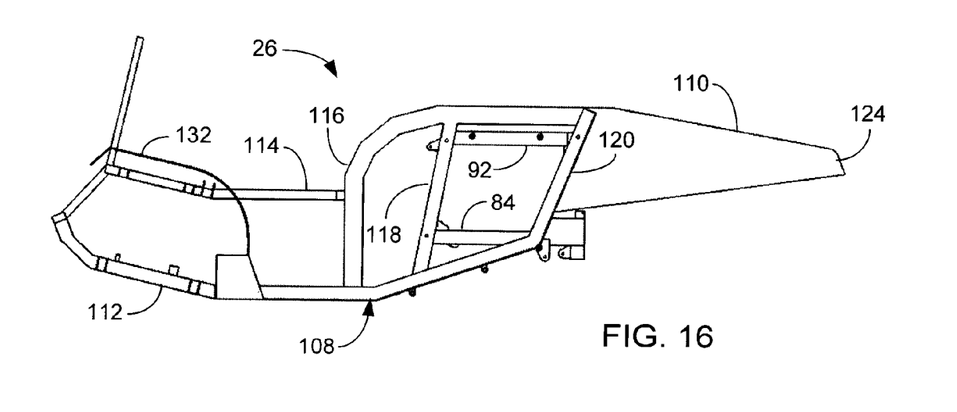
FIG. 16 is a left-side view of the chassis in accordance with the present invention.

Referring now to FIGS. 15 and 16, the chassis 26 generally comprises a frame 108 and shielding 109 to form a snow tunnel 110. Frames 84 and 92 are bolted to the frame 108. The frame 108 includes opposing lower main supports 112 which extend from the front portion 22 to the rear portion 24 of the vehicle 20. Upper supports 114 extend from the steering post 38 to a forward portion of the snow tunnel 110. The snow tunnel 110 includes opposing spaced-apart posts 116 extending upwardly from respective lower frame supports 84. Each post 116 further extends rearwardly and is supported on each side by forward and rearward stanchions, 118 and 120 respectively, also connected to respective lower main supports 84. Sheathing material 109, which may be constructed of metal or plastic, attaches to and disposes between each post 114 to define the tunnel 110 and contain snow and other debris kicked up by the endless track 52 during use. A tail section 124 of the tunnel 110 extends rearwardly from the rearward stanchions 120 and is designed to cover the rearward portion of the endless track 52. Forward shields 132 may be used to prevent kicked up snow or other debris from contacting the rider.

Contained with the tunnel and attached to the forward and rearward stanchions are the opposing lower frame 84 and upper frame 92 members, as well as cross members 126, for supporting the engine 48, transmission 50 and other parts as previously described. The frame structure between the forward and rearward portions of the chassis 26 create space for a gas tank 128 positioned forward of the endless track 52. The size of the gas tank 128 will define the width of the rider's feet position, which may be less or equal to the endless track width 52. With the gas tank 126 width less than the endless track width the rider will be able to position their feet in front of the endless track and at a width apart that is less than the endless track 52 width. Supports (not shown), may also be provided on the chassis for the rider to move their feet on the outside of the endless track as the rider chooses the most appropriate foot location for the riding conditions at any given point in time. Such supports may include the use of foot pegs, similar in fashion to motorcycle and ATV riding.

As described, the engine 48 and transmission 50 are fully contained within the endless track 52, which includes the width of the endless track 52. The engine 48 and transmission 50 are preferably integrally formed in much similar fashion as included with motorcycles. The transmission 50 is preferably a geared transmission wherein manual upshifting and downshifting is required by the rider, preferably through a clutching and shifting mechanism (not shown), similar to that of a motorcycle. Providing a push button for electronic shifting is also within the scope of the present invention. It is also within the scope of the present invention to provide a CVT instead of a geared transmission. The engine 48 is preferably a liquid cooled engine in fluid communication with a radiator 130 positioned on the front suspension assembly. The engine is preferably a single piston 4-stroke liquid cooled engine. Preferable engine displacements include 250 cc, 450 cc or 700 cc. However, greater or lesser displacement capacities are well within the scope of the present invention.

The all terrain endless track vehicle 20 of the present invention exhibits an overall vehicle efficiency of between 80-85%, which is made possible by a combination of factors present within the scope of this invention. First, the configuration of the drive roller 54 and idler rollers 60, 64, 68, 78, 80, 91, 93 ensures a bend radius of 10° or less at all times. Second, the endless track 52 is driven at the rear by the drive roller 54 which engages the endless track lugs (not shown) and puts only 20-25% of the length of the endless track under load. Third, the preset tightness of the endless track 52 may be much looser from typical front drive roller designs as a larger diameter rear drive roller is employed, providing greater engagement of the endless track lugs with the main drive 54. Finally, by replacing the belt driven CVT of a typical snowmobile with a geared transmission again increased the overall efficiency. Belt driven CVT's are known to be approximately 80% efficient while geared transmissions are known to be approximately 95% efficient.

With an overall vehicle efficiency increase over current snowmobiles, the all terrain endless track vehicle 20 of the present invention can be utilized in both winter and summer conditions by replacing the skis 34 with tires. The necessary engine operating temperature will be able to be maintained by the same radiator 130 in all climates similar to how a motorcycle and ATV is able to perform in summer time climates.

With the engine 48 located inside the endless track 52, a lower location for the gas tank 128 directly in front of the endless track 52 can now be achieved. As the two heaviest items on a snowmobile are the engine and the gas tank (when full), their positioning on the chassis in the present invention creates a lower overall vehicle center of mass, not achievable with snowmobiles of the prior art incorporating suspension. Also, because of the location of the engine 48 within the endless track 52 the overall length of the vehicle 20 is less than a typical snowmobile. Both a lower center of mass and a reduction in length makes for a more nimble and agile vehicle.

Although the present invention has been described with reference to preferred embodiments, workers skilled in the art will recognize that changes may be made in form and detail without departing from the spirit and scope of the invention.

The invention claimed is:

1. An all terrain endless track vehicle comprising:
    an endless track assembly;
    an engine supported by the endless track assembly;
    a transmission supported by the endless track assembly;
    a front shock absorber connected to the endless track assembly forward of the engine;
    a rear shock absorber connected to the endless track assembly rearward of the engine;
    a rearwardly positioned main driver mechanically linked to the transmission;
    a plurality of idler wheels disposed on the endless track assembly, the plurality of idler wheels and main driver defining an endless track contour;
    an endless track disposed on the plurality of idler wheels and main driver;
    a top frame member;
    a forward swing arm, the top frame member and the forward swing arm connected by the front shock absorber; and
    a rearward swing arm, the top frame member and the rearward swing arm connected by the rear shock absorber, wherein the engine, the transmission, the first shock absorber, the second shock absorber, the top member, the forward swing arm and the rearward swing arm are each contained within the contour of the endless track.

2. The all terrain endless track vehicle of claim 1 wherein the endless track assembly further comprises a skid rail pivotally connecting the forward swing arm and the rearward swing arm.

3. An all terrain endless track vehicle comprising:
    a top frame member;
    an engine supported by the top frame member;
    a transmission mechanically linked to the engine;
    a rearwardly positioned main driver mechanically linkable to the transmission;
    a rearward swing arm supporting the main driver;
    a skid rail having a first end connected to the rearward swing arm;
    a forward swing arm pivotally connected to an opposing second end of the skid rail;
    a first shock absorber connected to the top frame member and the forward swing arm;
    a second shock absorber connected to the top frame member and the rearward swing arm;
    a first set of idler wheels disposed on opposing ends of the top member;
    a second set of idler wheels disposed on opposing ends of the forward swing arm; and
    an endless track disposed on the first set of idler wheels, the second set of idler wheels and the main driver, wherein the top member, the engine, the transmission, the forward swing arm, the rearward swing arm, the first shock absorber and the second shock absorber are each contained within the endless track.

4. The all terrain endless track vehicle of claim 3 and further comprising:
    a chassis, the top member attached to the chassis; and
    a front suspension assembly attached to the chassis, the front suspension assembly engageable with the ground.

5. The all terrain endless track vehicle of claim 3 wherein the first shock absorber and the second shock absorber are uncoupled to one another.

6. The all terrain endless track vehicle of claim 3 wherein the first shock absorber is positioned forward of the engine.

7. The all terrain endless track vehicle of claim 3 wherein the second shock absorber is positioned rearward of the engine.

8. The all terrain endless track vehicle of claim 3 and further comprising a linking member connecting the skid rail to the rearward swing arm, the linking member having a first end pivotally attached to the skid rail and an opposing second end pivotally attached to the rearward swing arm.

9. An all terrain endless track vehicle comprising:
    a rigid subframe assembly including a top frame member;
    an engine supported by the subframe assembly;
    a transmission supported by the subframe assembly, the transmission mechanically linked to the engine;
    a forward swing arm pivotally attached to the subframe assembly;
    a rearward swing arm pivotally attached to the subframe assembly;
    a first shock absorber connected to the top frame member and the forward swing arm;
    a second shock absorber connected to the top frame member and the rearward swing arm; and
    an endless track disposed about the subframe assembly, wherein the engine, the transmission, the forward swing arm and the rearward swing arm are each contained within the endless track.

10. The endless track vehicle of claim 9 wherein the first shock absorber is positioned forward of the engine and the second shock absorber is positioned rearward of the engine.

11. The endless track vehicle of claim 9 and further comprising:
    a main driver supported by the rearward swing arm, the main driver mechanically linkable to the transmission; and
    a skid rail having opposing first and second ends, the first end pivotally attached to the forward swing arm and the second end connected to the rearward swing arm.

12. The endless track vehicle of claim 11 and further comprising a linking member connecting the skid rail to the rearward swing arm, the linking member having a first end pivotally attached to the second end of the skid rail and an opposing second end pivotally attached to the rearward swing arm.

13. The endless track vehicle of claim 11 and further comprising:
- a first set of idler wheels disposed on opposing ends of the top member; and
- a second set of idler wheels disposed on opposing ends of the forward swing arm, wherein the endless track disposes on the first set of idler wheels, the second set of idler wheels and the main driver to define a contour of the endless track.

14. The all terrain endless track vehicle of claim 13 and further comprising:
- a chassis, the subframe assembly attachable to the chassis; and
- a front suspension assembly engageable with the ground supported by the chassis.

* * * * *